(12) United States Patent
Staufer et al.

(10) Patent No.: US 6,773,524 B2
(45) Date of Patent: Aug. 10, 2004

(54) TAPE FEED FOR POSTAGE METER

(75) Inventors: Gerhard Staufer, Niederscheril (CH); Roger Frey, Bern (CH); Christian Moy, Grossaffoltern (CH)

(73) Assignee: Ascom Hasler Mailing Systems, Inc., Shelton, CT (US)

( * ) Notice: Subject to any disclaimer, the term of this patent is extended or adjusted under 35 U.S.C. 154(b) by 120 days.

(21) Appl. No.: 10/081,276

(22) Filed: Feb. 21, 2002

(65) Prior Publication Data

US 2002/0158401 A1 Oct. 31, 2002

Related U.S. Application Data

(60) Provisional application No. 60/270,796, filed on Feb. 23, 2001, provisional application No. 60/277,806, filed on Mar. 22, 2001, provisional application No. 60/277,841, filed on Mar. 22, 2001, provisional application No. 60/277,873, filed on Mar. 22, 2001, provisional application No. 60/277,931, filed on Mar. 22, 2001, provisional application No. 60/277,946, filed on Mar. 22, 2001, and provisional application No. 60/338,892, filed on Nov. 5, 2001.

(51) Int. Cl.[7] .............................................. B32B 31/20
(52) U.S. Cl. .................. 156/64; 156/277; 156/299; 156/363; 156/364; 156/442; 156/585; 156/573
(58) Field of Search ........................... 156/64, 362, 363, 156/364, 442, 556, 573, 564, 565, 277, 299; 221/188, 270, 271; 705/701, 406

(56) References Cited

U.S. PATENT DOCUMENTS

| | | | | | |
|---|---|---|---|---|---|
| 4,361,086 | A | * | 11/1982 | Simonotti et al. | 101/93.18 |
| 4,363,478 | A | * | 12/1982 | Tsukasaki | 271/10.06 |
| 4,739,343 | A | * | 4/1988 | Dolan | 347/214 |
| 5,197,629 | A | * | 3/1993 | Sanchez | 221/15 |
| 5,373,450 | A | * | 12/1994 | Gallagher et al. | 700/219 |

* cited by examiner

Primary Examiner—Richard Crispino
Assistant Examiner—George R. Koch, III
(74) Attorney, Agent, or Firm—Perman & Green, LLP

(57) ABSTRACT

A tape feed for a postage meter which uses the envelope transport system of the postage meter to feed a tape from a tape receptacle into the path of the envelope feed system. The tape receptacle is pivotally mounted adjacent one of the belts of the envelope transport system. A solenoid is connected to the tape receptacle through a cam pin and cam slot arrangement for providing the pivotal movement. When the solenoid is energized, the tape receptacle is pivoted into a position wherein the belt extends into a slot in the receptacle and grips a tape to discharge a tape from the receptacle and feed it into the envelope transport system. When the solenoid is de-energized, the solenoid pivots the receptacle into a position wherein the tapes in the receptacle are out of contact with the belt. A sensor is provided to de-energize the solenoid when the belt moves the leading edge of the tape into gripping relationship by the envelope transport system.

31 Claims, 8 Drawing Sheets

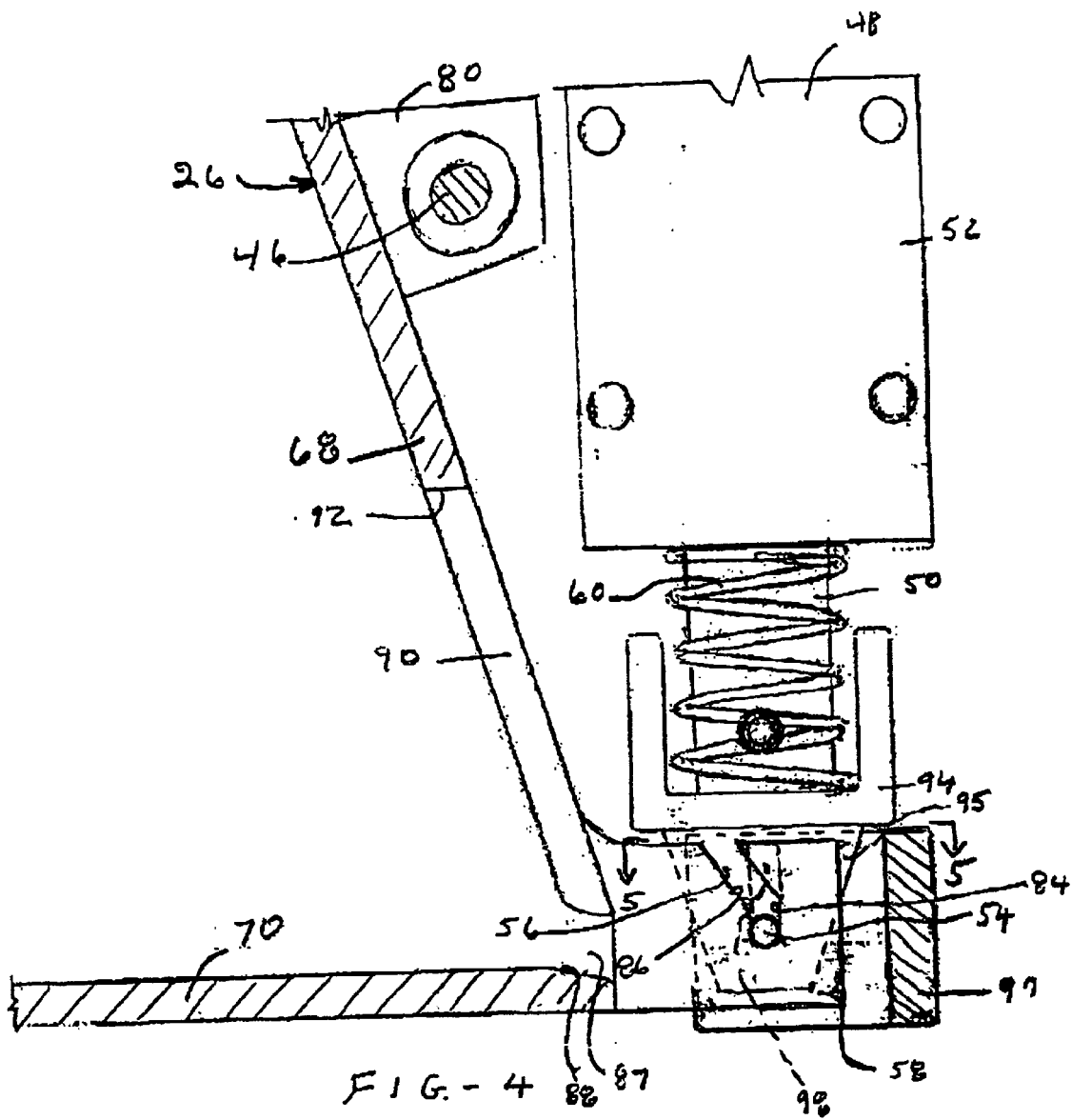
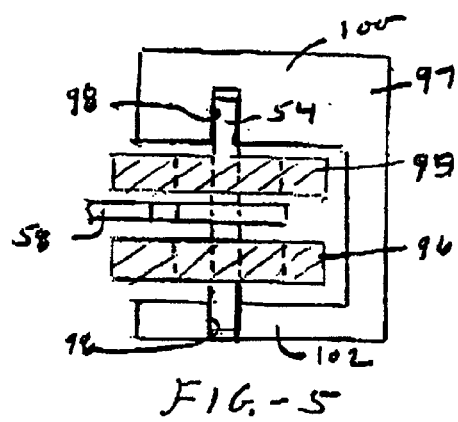
FIG.-4
FIG.-5

TAPE FEED FOR POSTAGE METER

CROSS-REFERENCE TO RELATED APPLICATIONS

This application claims priority of the following U.S. provisional patent applications: Ser. No. 60/270,796 filed Feb. 23, 2001, Ser. No. 60/277,806 filed on Mar. 22, 2001, Ser. No. 60/277,841 filed on Mar. 22, 2001, Ser. No. 60/277,873 filed on Mar. 22, 2001, Ser. No. 60/277,931 filed on Mar. 22, 2001, Ser. No. 60/277,946 filed on Mar. 22, 2001 and Ser. No. 60/338,892 filed on Nov. 5, 2001.

BACKGROUND OF THE INVENTION

1. Field of the Invention

The present invention relates to a tape feed for use in a postage meter. More particularly, this invention relates to a tape feed for feeding tapes or labels from a tape receptacle into the envelope feed system of a postage meter for affixing the amount of postage thereon.

2. Prior Art

The use of a postage meter to apply postage on mail pieces is in common practice today. A stack of envelopes to which postage is to be applied is placed to the feed side of the postage meter and fed one at a time into a feed system that feeds the envelope through the postage meter. The postage meter includes print heads that apply the correct postage to the envelope as it passes through the meter.

Occasionally there is need to apply postage to a mail piece that exceeds the maximum thickness of the mail pieces that can be fed through the feed system of the postage meter. To provide for this situation, the postage meter may be provided with a tape or label dispenser to enable the printing of postage on a separate tape or label. The operator determines the weight of the oversize piece and enters it into the control panel of the postage meter. The operator then instructs the postage meter to print the postage onto the tape or label which is then applied manually to the over size mail piece.

In a typical prior art tape dispensing system for postage meters, the labels or tapes are placed in a dispenser at a point upstream of the print heads. The dispenser feeds a tape or label one at a time into the same feed path as an envelope would be fed so that the tape or label passes through the print heads and the proper postage can be applied. The operator replenishes the tape or labels in the dispenser as they are used up.

One method of feeding the tape or labels from the dispenser into the feed path of the system is to use a feed roller with a one way clutch. The feed roller always remains in contact with the first tape in the dispenser. As the feed roller is actuated, it feeds the tape into the feed system so that the leading edge of the tape is grabbed by the envelope feed system. At this point, the feed roller, through a one way clutch, is allowed to freely rotate enabling the remainder of the tape to be pulled out of the dispenser by the envelope transport system.

However, such systems are relatively expensive, requiring a motor and a clutch, as well as a roller. Additionally, such components require a relatively large amount of space within the housing.

BRIEF SUMMARY OF THE INVENTION

In view of the above, it is an object of the present invention to provide an improved tape or label dispenser for a postage meter.

Another object of the present invention is the provision of an improved tape or label dispenser for a postage meter which is relatively less costly than previous systems.

Yet another object of the present invention is the provision of an improved tape or label dispenser for a postage meter that requires relatively smaller space than previous systems.

These and other objects and advantages of the present invention may be achieved through the provision of a tape feed for a postage meter having a housing with an envelope transport system therein which includes upper and lower drive belts for transporting an envelope through the postage meter. The tape feed comprises a receptacle for holding a plurality of tapes and having a downstream wall with a slot therein and a tape discharge opening. The receptacle is mounted in the housing for movement between a first position wherein said receptacle is spaced adjacent one of said upper drive belts with said drive belt out of engagement with a tape in said receptacle and a second position wherein said receptacle is positioned so that a portion of said drive belt extends into said slot and engages a tape in said receptacle and moves said tape from said receptacle through said discharge opening into said envelope transport system. A receptacle mover is provided for moving said receptacle between its first and second positions.

In accordance with another aspect of the invention there is provided a postage meter comprising a housing and an envelope transport system in said housing for transporting an envelope through the postage meter, said transport system comprising a set of upper and lower drive belts. Printheads are provided in said housing for affixing postage to an article being passed underneath said printheads by the envelope drive system. A tape receptacle for holding a plurality of tapes is mounted in said housing for pivotal movement between a first position and a second about a pivot pin and having a downstream wall, said tape receptacle being positioned upstream of one of said upper drive belts and having a slot in said down stream wall and a discharge opening. A solenoid is provided for pivoting said receptacle between its first position wherein said one of said upper drive belts is not contacting a tape in said receptacle and its second position wherein said one of said upper drive belts extends into said slot and engages a tape in the receptacle to draw the tape from said receptacle through said discharge opening into the path of the envelope feed system for engagement thereby whereby said tape is feed underneath the printheads.

In accordance with a further aspect of the invention there is provided a method of feeding tapes from a tape receptacle mounted in a postage meter and having a slot therein for access to a tape in said receptacle and a tape discharge slot to the envelope feed system of the postage meter which includes a set of upper and lower drive belts. The method comprises moving said receptacle toward one of the drive belts in said upper set until said one belt extends into said slot and engages a tape and pulls the leading edge of the tape from the receptacle through the tape discharge slot into the envelope feed system and moving said receptacle away from said one drive belt so that said one belt is out of contact with said tape in the receptacle when the leading edge of said tape is gripped by said envelope transport system.

BRIEF DESCRIPTION OF THE DRAWINGS

The foregoing aspects and other features of the present invention are explained in the following description, taken in connection with the accompanying drawings, wherein:

FIG. 4 is an enlarged vertical view, partially in section, showing the connection of the solenoid to the tape receptacle;

FIG. 5 is a cross-sectional view taken along the lines 55 of FIG. 4;

DETAILED DESCRIPTION OF THE PREFERRED EMBODIMENT

Figure 1:
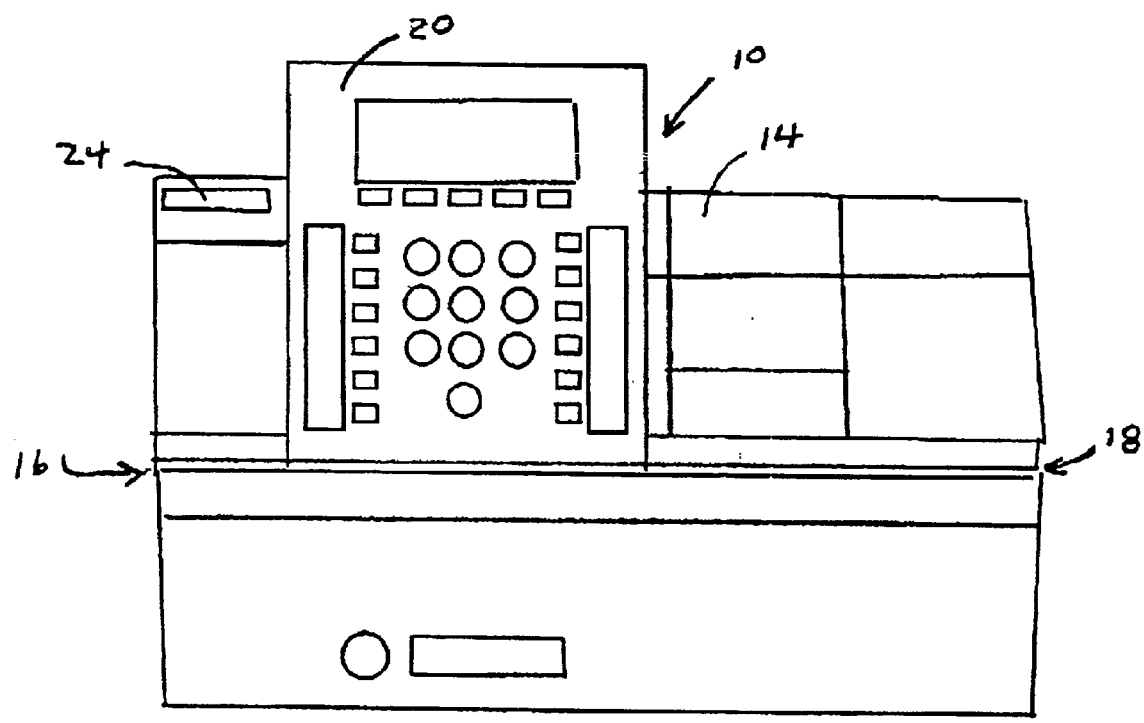
FIG. 1 is a simplified front view of a postage meter incorporating the tape or label dispensing system of the present invention.
Figure 2:
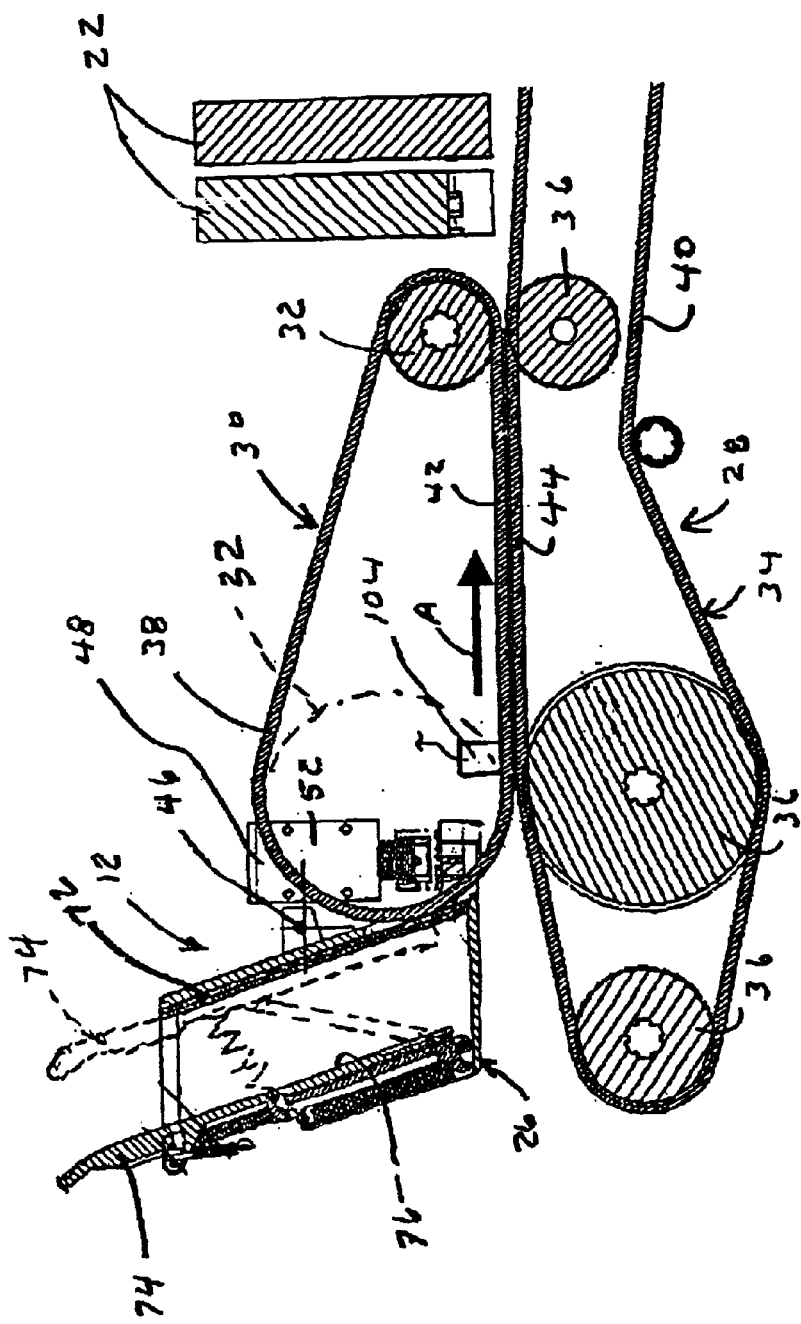
FIG. 2 is a vertical schematic view, partially in section, of the tape dispenser and postage meter.

Referring to the drawings, and particularly FIGS. 1 and 2, there is shown a postage meter 10 that incorporates the tape feed system 12 of the present invention. As is conventional, the postage meter 10 includes a housing 14 which is provided with an in-feed 16 at the left hand or upstream end of the meter 10 and an out-feed 18 at the right hand or downstream end of the meter 10 as viewed in FIG. 1. A control panel 20 is provided to input the required postage amount and control the meter 10. To the right of the control panel 20, print heads 22 are mounted within the housing 14. To the left of the control panel 20 the housing 14 is provided with an opening 24 for access to a tape receptacle 26.

In regular use, the correct postage amount is entered into the control panel 20 and an envelope (not shown) is feed into the in-feed 16 and transported by a timed envelope transport system 28 through the postage meter 10. The correct postage is imprinted upon the envelope by the print heads 22, after which, the envelope is discharged from the meter 10 through the out-feed 18. In some cases, an automatic feed system (not show) may be provided to automatically feed envelopes to the in-feed 16 of the postage meter 10.

Referring to FIG. 2, the envelope transport system 28 may generally comprise an upper set of drive belts 30 mounted on appropriate pulleys 32. Any suitable drive elements can be used in the transport system. For example, drive rollers may be used instead of belts, or a mixture of drive rollers and belts may be used. (The left-hand pulley is shown in phantom for the sake of clarity) A lower set of drive belts 34 is positioned below the upper set 30 and is mounted on appropriate pulleys 36 as shown. Preferably there are four belts in each of the sets. Each of the belts 38 of the upper set 30 is superimposed over a corresponding belt 40 of the lower set 34. The upper set of drive belts 30 is driven in a counter clockwise direction, while the lower set of drive belts 34 is driven in a clockwise direction. This results in the lower run 42 of the of the upper drive belts 38 and the upper run 44 of the lower drive belts 40 running in the same direction indicated be the arrow A in FIG. 2. In use, an envelope is fed between the lower run 42 of the upper set of drive belts 30 and the upper run 44 of the lower set of drive belts 34. The envelope is gripped between the two runs and transported underneath the printheads 22 to the out feed 18. Suitable controls (not shown) may be provided for driving the upper and lower sets of drive belts 30,34 in timed relationship.

The tape feed system 12 includes the tape receptacle 26 that is pivotally mounted in the housing 14 about a pivot pin 46. The tape receptacle 26 is positioned upstream of, and adjacent to, one of the belts 38 in the upper set of drive belts 30 of the envelope transport system 28. The tape feed system 12 also includes a tape receptacle mover in the form of an electrically operated solenoid 48 affixed in the housing 14 and positioned downstream of the tape receptacle 26. The solenoid 48 is electrically connected to the control system (not shown) of the postage meter 10 for control of its energization.

Figure 10:
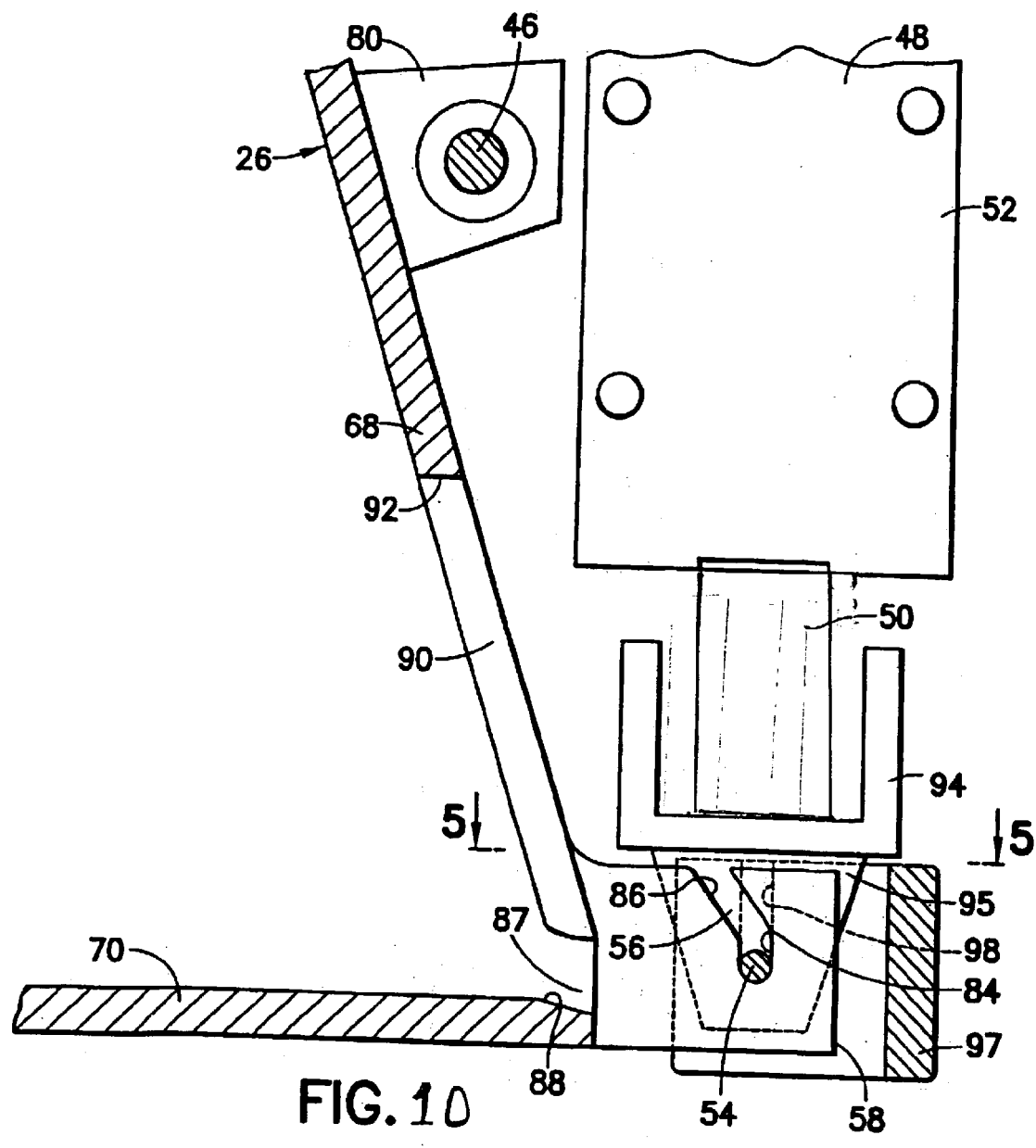
FIG. 10 is a view similar to that of FIG. 4, but showing the plunger 50 biased only by gravity.

Referring to FIGS. 4 and 5, the solenoid 48 has a plunger 50 extending downwardly from the housing 52 of the solenoid 48. The plunger 50 has a cam pin 54 connected thereto that is positioned in a cam slot 56 in a cam slot arm 58 extending from the tape receptacle 26. When the solenoid 48 is electrically energized, the plunger 50 is retracted into the housing 52. The action of the cam pin 54 on the cam slot 56 causes the tape receptacle 26 to be pivoted about its pivot pin 46 in a counter clockwise direction as viewed in FIG. 2. The solenoid 48 includes a spring 60 to spring bias the plunger 50 to its extended position after it is de-energized and return the tape receptacle 26 to it original position. In the alternative, spring 60 could be eliminated to allow plunger 50 to fall by gravity to its lower position, as shown in FIG. 10.

More specifically, referring to FIGS. 2–6 (72 and 76 are not shown in FIGS. 3 to 5), the tape receptacle 26 includes a housing 62 having spaced parallel side walls 64, 66 and a front or downstream wall 68 slanted at an angle to the vertical with bottom of the front wall 68 more downstream than the top of the wall 68. A bottom plate 70 closes the bottom of the housing 62 while the top is open to receive tapes 72. A pusher bar 74 is affixed to the housing 62 and has a pressing surface 76 parallel to the front downstream wall 68. The pusher bar 74 is adapted to be retained in a retracted position wherein the pressing surface 76 is spaced from the inside of the front wall 68 for loading tapes 72 into the receptacle 26. The pusher bar 74 may be released so that the pressing surface 76 engages the back of the rearward tape 72 in the tape receptacle 26 and presses the tapes 72 against the inside surface of the front wall 68 as shown in phantom in FIG. 2, under a spring bias.

Figure 3:
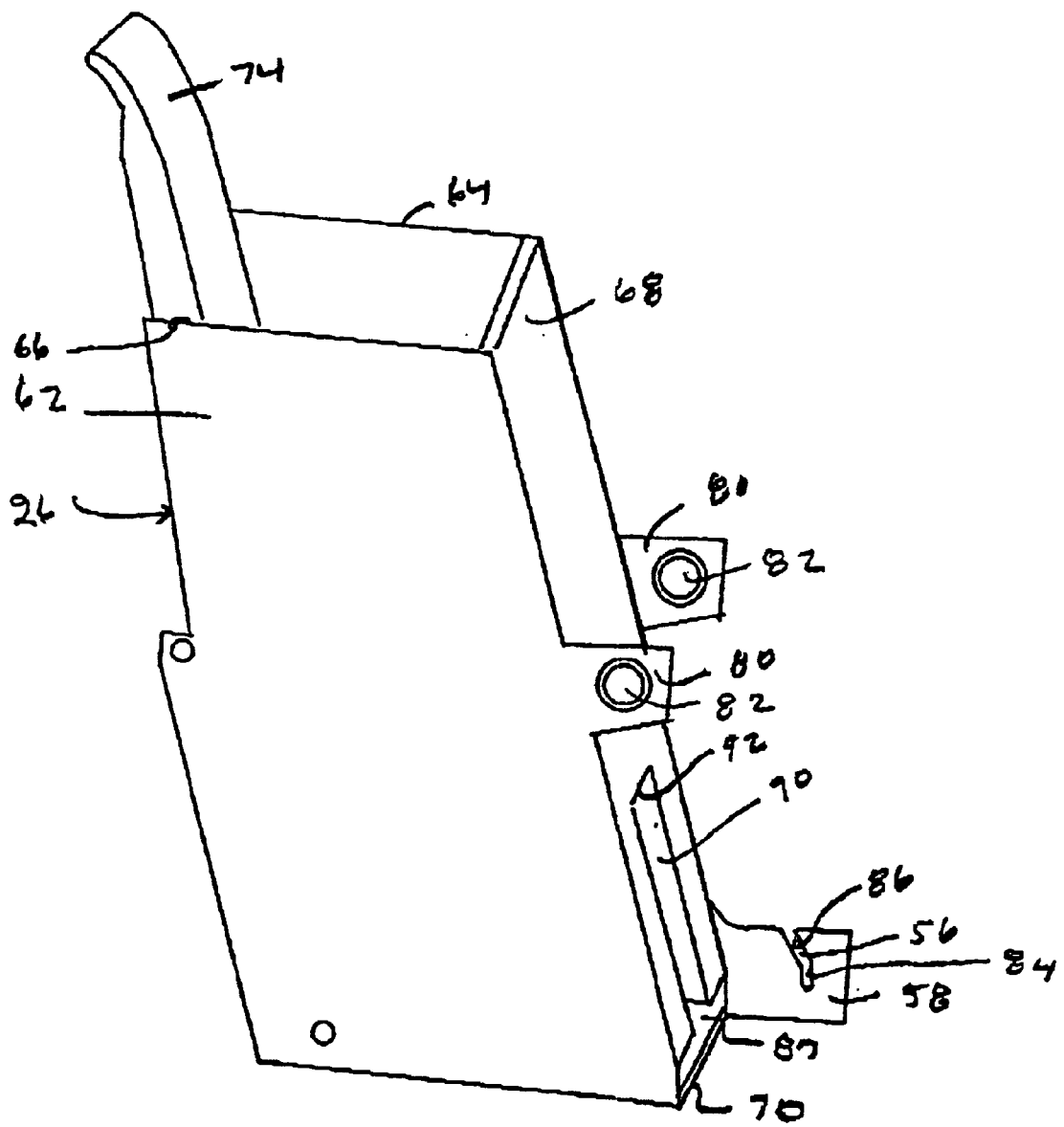
FIG. 3 is an enlarged isometric view of the tape receptacle used in the tape dispensing system of the present invention.

Each of the sidewalls 64,66 of the housing 62 of the tape receptacle 26 has an ear portion 80 extending from its downstream edge in a downstream direction as shown in FIGS. 2 and 3. Each ear portion 80 is provided with an aperture 82 therethrough to receive the pivot pin 46 for mounting the tape receptacle 26 pivotally in the postage meter housing 14. The cam slot arm 58 extends downstream from the downstream edge of the rear sidewall 64 and has the cam slot 56 therein for receiving the cam pin 54 attached to the solenoid 48. The cam slot 56 includes a lower vertically extending locking portion 84 and an upper motion inducing portion 86 which slopes upwardly and upstream toward the tape receptacle 26 from the locking portion 84.

A discharge slot 87 is provided at the bottom of the front downstream wall 68 of the housing 62 of the tape receptacle 26. The bottom plate is provided with a lip 88 at its downstream end forming the bottom of the discharge slot 87. The front or downstream wall 68 is also provided with an elongated slot 90 extending upwardly from the discharge slot 86 to a point below the ear portions 80. The width of the slot 90 is such that it will receive the width of a belt 38 of the upper set of drive belts 30. The height of the slot 90 is such that with the given radius of the belt 38 around its pulley 32, when the tape receptacle 26 is pivoted toward the belt 38, the belt will be able to enter the slot 90 to engage a tape 72 without contacting the upper edge 92 of the slot 90.

The housing 52 of the solenoid 48 is mounted in the housing 14 of the postage meter 10 immediately downstream of the tape receptacle 26 and with the plunger 50 extending vertically downwardly from the housing 52. A yoke member 94 is attached to the end of the plunger 50 and includes spaced downwardly extending fingers 95,96 in which the cam pin 54 is secured. A U-shaped guide block 97 is secured within the postage meter housing 14 into which the fingers 95, 96 of the yoke member 94 extend. The guide block 97 has a vertical slot 98 in each of its opposed walls 100,102 in which the ends of the cam pin 54 ride. The cam arm 58 of the tape receptacle 26 extends into the space between the two fingers 95,96 of the yoke member 94 with the cam pin 54 located in the cam slot 56. The spring 60 is provided between the bottom of the solenoid housing 52 and the yoke member 94 to bias the plunger 50 into its extended position. The slots 98 in the guide block 97 help to maintain vertical movement of the cam pin 54 as the plunger is retracted and extended.

With this arrangement, when the solenoid 48 is energized, the plunger 50 is retracted and moves vertically upwardly as viewed in the drawings, with the cam pin 54 being guided by the vertical slots 98 in the guide block 96. The cam pin 54 rides upwardly in the vertical portion 84 of the cam slot 56 in the cam arm 58 of the tape receptacle 26 with no movement of the tape receptacle 26 occurring. When the cam pin 54 reaches the sloping portion 86 of the cam slot 56, it engages the upper surface of that portion of the cam slot 56 so that upon continued vertical upward movement of the cam pin 54, the tape receptacle 26 is caused to pivot counter clockwise about it pivot pin 46.

When the solenoid 48 is de-energized, the spring 60 forces the plunger 50 to extend, moving the cam pin 54 downwardly against the lower surface of the sloping portion 86 of the cam slot 56. This causes the tape receptacle 26 to pivot clockwise back to its original position until the cam pin 54 reaches the vertical locking portion 84 of the cam slot 56 and no further movement of the receptacle will occur. Further extension of the plunger 50 moves the cam pin 54 to the bottom of the locking portion 84 of the cam slot 56 with the result that the tape receptacle 26 is effectively locked in place. The solenoid 48 is caused to be de-energized by a sensor 104 (FIG. 2) located slightly downstream of the entrance into the upper and lower run 44,42 of the belts 40 and 38 and adjacent the belt 38, which is involved in discharging a tape 72. The sensor 104 is positioned to sense when the leading edge of a tape 72 has been gripped between an upper and lower belt 38,40 of the envelope transport system 28 so the tape 72 can be can be carried by the transport system 28 through the postage meter 10. The sensor 104 may be of any suitable type capable of sensing the presence of a tape such as a proximity sensor. The sensor 104 is electrically connected to the control system (not shown) for controlling the de-energization of the solenoid 48.

Figure 6:
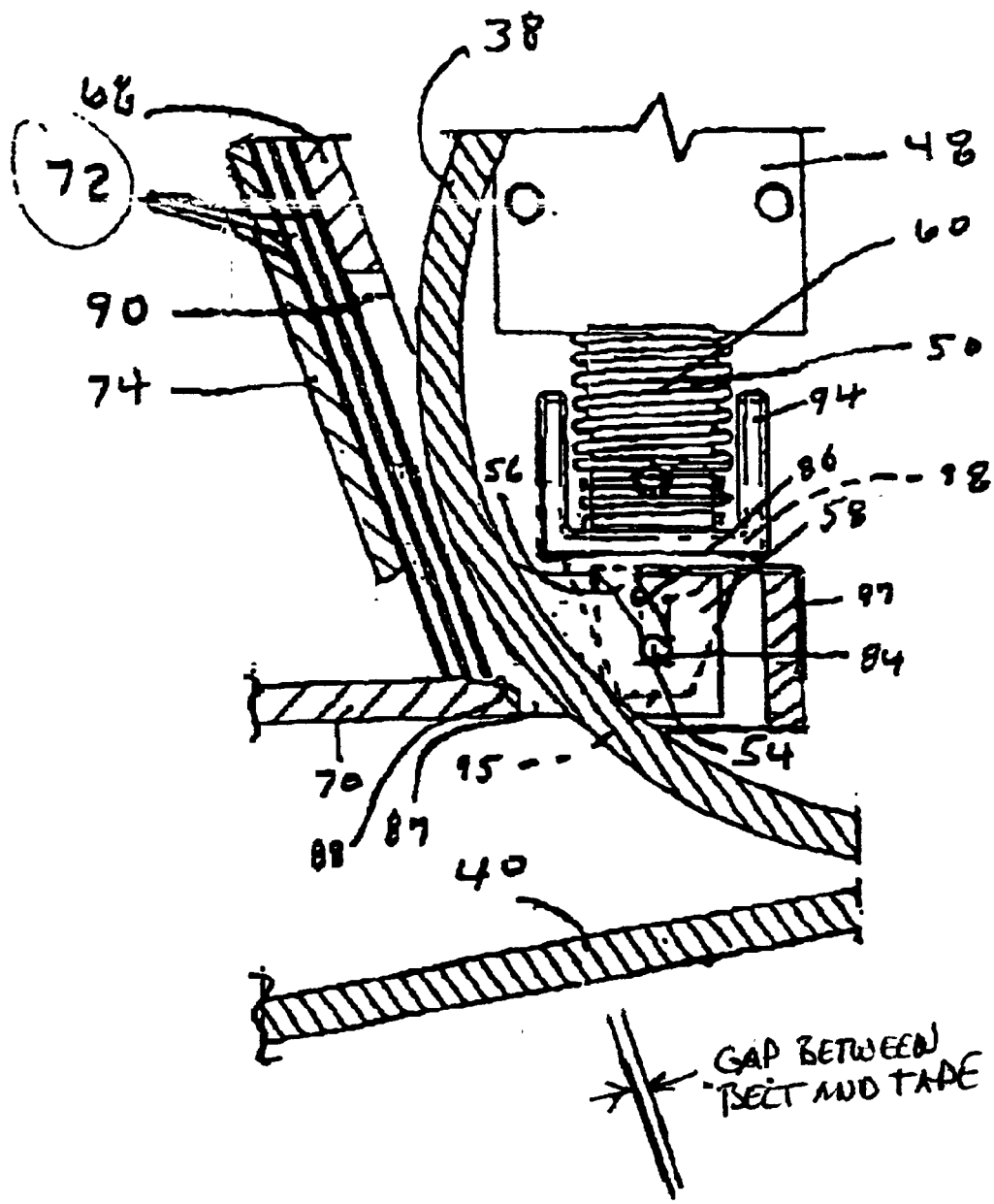
FIG. 6 is an enlarged view, partially in section, of the left hand end portion of the view of FIG. 1, showing the tape dispensing system in the non-feeding position wherein the belt is not in contact with the tape.

As shown in FIG. 2, the tape receptacle is positioned in the postage meter housing 14 upstream of one of the upper drive belts 38 with an arcuate portion of the drive belt 38 extending a portion of the way into the slot 90 in the housing 62 of the tape receptacle 26. In the idle position of the tape feed system 12, with the solenoid 48 de-energized and the cam pin 54 located in the vertical locking portion 84 of the cam slot 86, the drive belt 38 does not engage or touch the tapes 72 within the tape receptacle 26 as shown in FIG. 6. Preferably, the tape receptacle 26 is associated with the upper drive belt 38 which is rearward most in the postage meter housing 14, so that when a tape 72 is fed into the envelope transport system 28, the tape 72 is positioned to pass underneath the print heads 22.

In regular operation of the postage meter 10, with the proper information entered into the control panel 20, envelopes are fed into the in-feed 16 and are gripped between the upper and lower sets of drive belts 30,34 of the envelope transport system 28. The envelopes are fed by the envelope transport system 28 underneath the print heads 22, which apply the proper postage to the envelope, and then are discharged though the out-feed 18.

When it is desired to apply postage to a tape 72 rather than an envelope, a supply of tapes 72 is placed into the tape receptacle 26 and the push bar 74 released to bias the tapes 72 against the inside of the downstream wall 68 of the tape receptacle 26. The desired postage may be entered into the control panel 20 of the postage meter 10 and the tape feed system 12 actuated.

Figure 7:
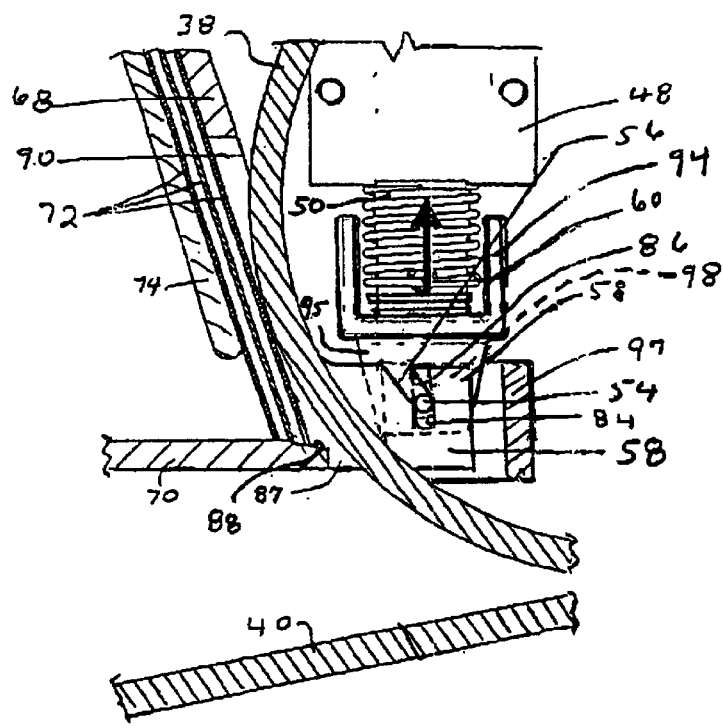
FIG. 7 is an enlarged view, partially in section, of the left hand end portion of the view of FIG. 1, showing the tape dispensing system as the tape receptacle is just being pivoted into position to grab a tape in the tape receptacle.

Upon actuation of the system 12, the solenoid 48 is energized causing the plunger 50 to retract and the cam pin 54 is moved upwardly and begins to enter the sloping upper portion 86 of the cam slot 56 in the cam arm 58 of the tape receptacle 26 as shown in FIG. 7. As the cam pin 54 enters the sloping portion 86, the lower end of tape receptacle 26 is pivoted toward the drive belt 38 in the slot 80 in the receptacle 26 so that the forward most tape 72 in the receptacle 26 is engaged by the drive belt 38 and is started to be pulled downwardly by the moving drive belt 38.

Figure 8:
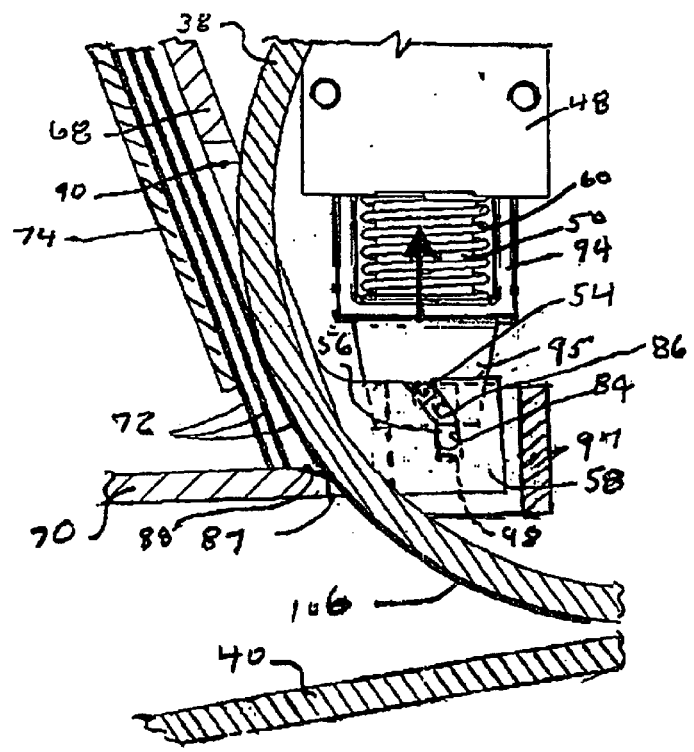
FIG. 8 is an enlarged view, partially in section, of the left hand end portion of the view of FIG. 1, showing the tape dispensing system as the tape receptacle has been pivoted into position to grab and pull a tape from the tape receptacle and feed its leading edge into the envelope transport system.
Figure 9:
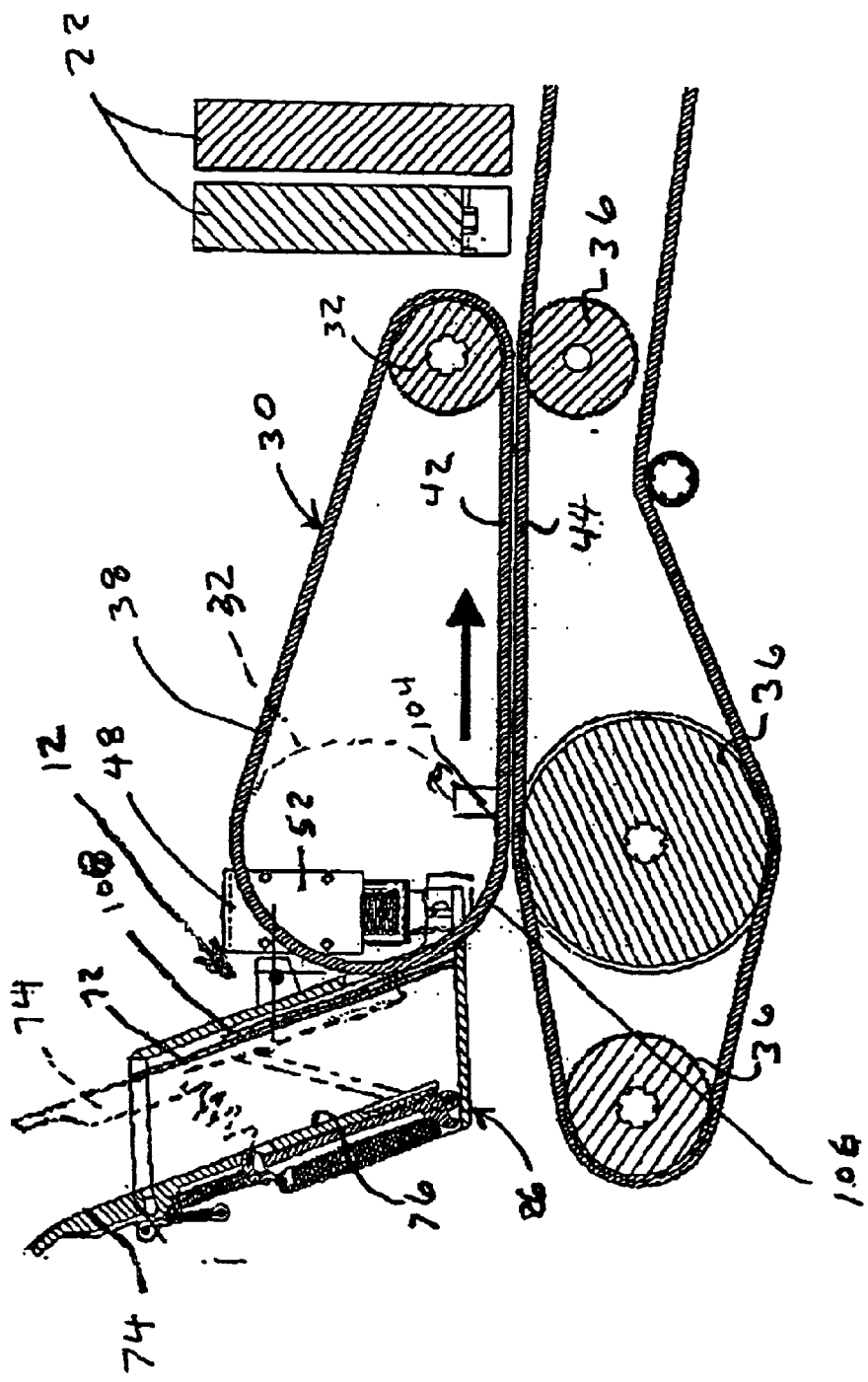
FIG. 9 is a view similar to that of FIG. 2, but showing the leading edge of a tape being feed into the envelope feed system.

As the solenoid plunger 50 continues its retraction to its retracted position shown in FIGS. 8 and 9, the cam pin 54 continues its upward vertical movement and, due to the sloping nature of the cam slot 56 in the cam arm 58 of the tape receptacle 26, forces the cam arm 58 upwardly and forwardly, thereby imparting pivotal movement to the tape receptacle 26. The tape receptacle 26 is pivoted toward the belt 38 causing the belt 38 to extend into the slot 90 in the receptacle 26 so that the moving belt 38 continues to engage the tape 72 and actually pushes the tape 72 against the bias of the pusher bar 74. The moving belt 38 continues to pull the tape 72 from the receptacle 26 through the discharge slot 87 and into the gap between the upper and lower feed belts 38,40 for engagement thereby.

With the friction coefficient between belt and first tape being much higher than between first tape and second tape, and the geometry of the lip 88 chosen accordingly, it is provided that only one tape is pulled from the stack at a time.

At this point, the upper and lower feed belts 38,40 engage the leading edge 106 of the tape 72 and begin transporting the tape 72 through the postage meter 10 to the print heads 22 and out-feed 18. At a point shortly after the leading edge 106 of the tape 72 is engaged by the upper and lower feed belts 38,40, the sensor 104 senses the presence of the leading edge 106 of the tape 72 and causes the solenoid 48 to be de-energized. The solenoid 48 is thus de-energized prior to the time the trailing edge 108 of the tape 72 passes out of engagement with the upper drive belt 38 extending into the slot 90 in the tape receptacle 26. With the solenoid 48 de-energized, its plunger 50 is extended downwardly under the spring force, causing the tape receptacle 26 to pivot away from the upper drive belt 38 so that the trailing end of the tape 72 still in the receptacle 26 is no longer contacted by the drive belt 38. The upper and lower drive belts 38,40 of the envelope transport system 28 now engaging the forward part of the tape 72 accomplish continued withdrawal of the tape from the tape receptacle and move the tape 72 through the postage meter 10.

With the above system, there is provided a tape dispenser system for a postage meter that utilizes a drive belt of the envelope transport system to engage and discharge a tape from the tape dispenser. This eliminates the necessity for any additional roller, clutch, other drive members and motor to accomplish the feeding of a tape.

With the self-locking properties of part 84 of the cam slot 56 it is provided that the tape receptacle 26 can not be pushed towards the belt-tape engaging second position from external forces occurring when reloading tapes into the tape receptacle. It is therefore possible to reload tapes even with running letter transport without the danger of inadvertently feeding a tape into the letter transport It should be understood that the foregoing description is only illustrative of the invention. Various alternatives and modifications can be devised by those skilled in the art without departing from the invention. Accordingly, the present invention is intended to embrace all such alternatives, modifications and variances.

What is claimed is:

1. A tape teed for a postage meter having a housing with an envelope transport system therein which includes upper and lower drive belts for transporting an envelope through the postage meter, said tape feed comprising:

a receptacle for holding a plurality of tapes and having a downstream wall with a slot therein and a tape discharge opening, said receptacle being mounted in said housing for movement between a first position wherein said receptacle is spaced adjacent one of said upper drive belts with said one of said upper drive belt out of engagement with a tape in said receptacle and a second position wherein said receptacle is positioned so that a portion of said drive belt extends into said slot and engages a tape in said receptacle and moves said tape from said receptacle through said discharge opening into said envelope transport system; and a receptacle mover for moving said receptacle between its first and second positions.

2. The tape feed of claim 1 wherein said receptacle mover is a solenoid mounted in said housing and having a plunger connected to said receptacle.

3. The tape feed of claim 2 wherein said plunger is normally extended from said solenoid when said solenoid is de-energized to hold said receptacle in its first position and retractable when the solenoid is energized to move said receptacle into its second position.

4. The tape feed of claim 3 further including a sensor positioned in said housing for sensing when a tape has been gripped by the envelope transport system as it is being moved from said receptacle and cause de-energization of said solenoid.

5. The tape feed of claim 3 wherein said receptacle has a cam arm having a cam slot therein, said plunger of said solenoid having a cam pin attached thereto, said cam pin being positioned in said cam slot to impart movement to said receptacle as said plunger is retracted and extended.

6. The tape feed of claim 5 wherein said receptacle is mounted for pivotal movement in said housing, said cam slot having a first locking portion and a second pivoting portion, said cam pin being positioned in said locking portion when said plunger is extended and in said pivoting portion as it is being retracted.

7. The tape feed of claim 5 wherein said plunger is spring biased into its extended position.

8. The tape feed of claim 5 wherein said plunger is gravity biased into its extended position.

9. The tape feed of claim 7 further including a guide block with opposed walls mounted in said housing under said solenoid, each of said opposed walls having a slot therein, the ends of said cam pin being received in said slots for guiding movement therein.

10. The tape feed of claim 3 further including a pusher bar mounted in said receptacle to bias the tapes in the receptacle against the downstream wall of the receptacle, said pusher bar being retractable to load tapes into the receptacle.

11. The postage meter of claim 10 wherein said solenoid includes a downwardly extending plunger connected to said receptacle, said plunger being in a normally extended when said solenoid is de-energized to hold said receptacle in its first position and retractable when the solenoid is energized to move said receptacle into its second position.

12. A postage meter comprising:

a housing;

an envelope transport system in said housing for transporting an envelope through the postage meter, said transport system comprising a set of upper and lower drive belts;

printheads in said housing for affixing postage to an article being passed underneath said printheads by the envelope drive system;

a tape receptacle for holding a plurality of tapes mounted in said housing for pivotal movement between a first position and a second about a pivot pin and having a downstream wall, said tape receptacle being positioned upstream of one of said upper drive belts and having a slot in said down stream wall and a discharge opening; and a solenoid for pivoting said receptacle between its first position wherein said one of said upper drive belts is not contacting a tape in said receptacle and its second position wherein said one of said upper drive belts extends into said slot and engages a tape in the receptacle to draw the tape from said receptacle through said discharge opening into the path of the envelope feed system for engagement thereby whereby said tape is feed underneath the printheads.

13. The postage meter of claim 12 further including a sensor positioned in said housing for sensing when a tape has been gripped by the envelope transport system as it is being moved from said receptacle and cause de-energization of said solenoid so said plunger can return to its extended position.

14. The tape feed of claim 12 wherein said receptacle has a cam arm having a cam slot therein extending downstream from said receptacle, said plunger of said solenoid having a cam pin attached thereto, said cam pin being positioned in said cam slot to impart movement to said receptacle as said plunger is retracted and extended.

15. The tape feed of claim 14 wherein said cam slot has a first locking portion and a second pivoting portion, said cam pin being positioned in said locking portion when said plunger is extended and in said pivoting portion as it is being retracted.

16. The tape feed of claim 14 wherein said plunger is spring biased into its extended position.

17. The tape feed of claim 14 wherein said plunger is gravity biased into its extended position.

18. The tape feed of claim 15 further including a guide block with opposed walls mounted in said housing under said solenoid, each of said walls having a slot therein, said cam pin being received in said slots for guiding movement therein.

19. The tape feed of claim 16 further including a pusher bar mounted in said receptacle to bias the tapes in the receptacle against the downstream wall of the receptacle, said pusher bar being retractable to load tapes into the receptacle.

20. A method of feeding tapes from a tape receptacle mounted in a postage meter and having a slot therein for access to a tape in said receptacle by the envelope feed system of the postage meter which includes a set of upper and lower drive belts comprising:

moving said receptacle toward one of the drive belts in said upper set until said one belt extends into said slot and engages a tape and pulls the leading edge of the tape from the receptacle through a tape discharge slot into the envelope feed system; and moving said receptacle away from said one drive belt so that said one belt is out of contact with a tape in the receptacle when the leading edge of said tape is gripped by said envelope transport system.

21. The method of claim 20 wherein said receptacle is pivoted about a pivot pin to move a tape into contact with said one belt.

22. The method of claim 20 further comprising sensing when the leading edge of the tape is gripped by the envelope transport system and pivoting said receptacle away from said one drive belt in response to said sensing.

23. A tape feed for a postage meter having a housing with an envelope transport system therein which includes upper and lower drive elements for transportation an envelope through the postage meter, said tape feed comprising:

a receptacle for holding a plurality of tapes and having a downstream wall with a slot therein and a tape discharge opening, said receptacle being mounted in said housing for movement between a first position wherein said receptacle is spaced adjacent one of said upper drive element with said drive element out of engagement with a tape in said receptacle and a second position wherein said receptacle is positioned so that portion of said drive element extends into said slot and engages a tape in said receptacle and moves said tape from said receptacle through said discharge opening into said envelope transport system; and a receptacle mover for moving said receptacle between its first and second positions.

24. The tape feed of claim 23 wherein drive elements are rollers.

25. The tape feed of claim 23 wherein said drive elements is a mixture of rollers and belts.

26. A postage meter comprising:

a housing;

an envelope transport system in said housing for transporting an envelope through the postage meter, said transport system comprising a set of upper and lower drive elements; printheads in said housing for affixing postage to an article being passed underneath said printheads by the envelope drive system;

a tape receptacle for holding a plurality of tapes mounted in said housing for pivotal movement between a first position and a second about a pivot pin and having a downstream wall, said tape receptacle being positioned upstream of one of said upper drive elements and having a slot in said down stream wall and a discharge opening; and a solenoid for pivoting said receptacle between its first position wherein said one of said upper drive elements is not contacting a tape in said receptacle and its second position wherein said one of said upper drive elements extends into said slot and engages a tape in the receptacle to draw the tape from said receptacle through said discharge opening into the path of the envelope feed system for engagement thereby whereby said tape is feed underneath the printheads.

27. The postage meter of claim 26 wherein said upper-drive elements are rollers.

28. The postage meter of claim 27 wherein said upper drive elements are a mixture of belts and rollers.

29. A method of feeding tapes from a tape receptacle mounted in a postage meter and having a slot therein for access to a tape in said receptacle by the envelope feed system of the postage meter which includes a set of upper and lower drive elements comprising:

moving said receptacle toward one of the drive elements in said upper set until said one belt extends into said slot and engages a tape and pulls the leading edge of a tape from the receptacle through the tape discharge slot into the envelope feed system; and moving said receptacle away from said one drive element so that said one belt is out of contact with a tape in the receptacle when the leading edge of said tape is gripped by said envelope transport system.

30. The method of claim 29 wherein said drive elements are rollers.

31. The method of claim 29 wherein said drive elements are a mixture of belts and rollers.

* * * * *